US008116954B2

(12) United States Patent
Livshiz et al.

(10) Patent No.: US 8,116,954 B2
(45) Date of Patent: Feb. 14, 2012

(54) RPM TO TORQUE TRANSITION CONTROL

(75) Inventors: Michael Livshiz, Ann Arbor, MI (US); Scott J. Chynoweth, Davison, MI (US); Todd R. Shupe, Milford, MI (US); Christopher E. Whitney, Highland, MI (US); Robert C. Simon, Jr., Brighton, MI (US); Vivek Mehta, Bloomfield Hills, MI (US); Ning Jin, Novi, MI (US)

(73) Assignee: GM Global Technology Operations LLC

( * ) Notice: Subject to any disclaimer, the term of this patent is extended or adjusted under 35 U.S.C. 154(b) by 962 days.

(21) Appl. No.: 12/019,921

(22) Filed: Jan. 25, 2008

(65) Prior Publication Data

US 2009/0018733 A1 Jan. 15, 2009

Related U.S. Application Data

(60) Provisional application No. 60/984,900, filed on Nov. 2, 2007.

(51) Int. Cl.
*G06F 19/00* (2011.01)
*G06G 7/70* (2006.01)

(52) U.S. Cl. .......................... 701/54; 701/101; 123/399

(58) Field of Classification Search .................... 701/54
See application file for complete search history.

(56) References Cited

U.S. PATENT DOCUMENTS

| | | | | |
|---|---|---|---|---|
| 6,704,638 | B2 | 3/2004 | Livshiz | |
| 7,463,970 | B2 * | 12/2008 | Livshiz et al. | 701/114 |
| 7,614,384 | B2 * | 11/2009 | Livshiz et al. | 123/399 |
| 7,630,811 | B2 * | 12/2009 | Jiang | 701/54 |
| 7,650,219 | B2 * | 1/2010 | Livshiz et al. | 701/101 |
| 7,788,024 | B2 * | 8/2010 | Livshiz et al. | 701/114 |
| 7,972,242 | B2 * | 7/2011 | Cullen et al. | 477/107 |

OTHER PUBLICATIONS

U.S. Appl. No. 11/656,929, filed Jan. 23, 2007, Michael Livshiz.
U.S. Appl. No. 11/685,735, filed Mar. 13, 2007, Michael Livshiz.

* cited by examiner

*Primary Examiner* — Thomas Black
*Assistant Examiner* — Lin B Olsen

(57) ABSTRACT

An engine control module comprises a torque control module, an engine speed (RPM) control module, and an actuator module. The torque control module determines a first desired torque based on a requested torque. The RPM control module selectively determines a second desired torque based on a desired RPM. The torque control module determines the first desired torque further based on the second desired torque when the engine control module is transitioning from an RPM control mode to a torque control mode. The RPM control module determines the second desired torque further based on the first desired torque when the engine control module is transitioning from the torque control mode to the RPM control mode. The actuator module controls an actuator of an engine based on the first and second desired torques.

23 Claims, 7 Drawing Sheets

RPM TO TORQUE TRANSITION CONTROL

CROSS-REFERENCE TO RELATED APPLICATIONS

This application claims the benefit of U.S. Provisional Application No. 60/984,900, filed on Nov. 2, 2007. The disclosure of the above application is incorporated herein by reference.

FIELD

The present disclosure relates to control of internal combustion engines and, more particularly, to transitioning between RPM and torque control of internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control module comprises a torque control module, an engine speed (RPM) control module, and an actuator module. The torque control module determines a first desired torque based on a requested torque. The RPM control module selectively determines a second desired torque based on a desired RPM. The torque control module determines the first desired torque further based on the second desired torque when the engine control module is transitioning from an RPM control mode to a torque control mode. The RPM control module determines the second desired torque further based on the first desired torque when the engine control module is transitioning from the torque control mode to the RPM control mode. The actuator module controls an actuator of an engine based on the first desired torque when the engine control module is in the torque control mode and based on the second desired torque when the engine control module is in the RPM control mode.

A method of operating an engine control module comprises determining a first desired torque based on a requested torque, selectively determining a second desired torque based on a desired RPM, determining the first desired torque further based on the second desired torque when the engine control module is transitioning from an RPM control mode to a torque control mode, determining the second desired torque further based on the first desired torque when the engine control module is transitioning from the torque control mode to the RPM control mode, and controlling an actuator of an engine based on the first desired torque when the engine control module is in the torque control mode and based on the second desired torque when the engine control module is in the RPM control mode.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
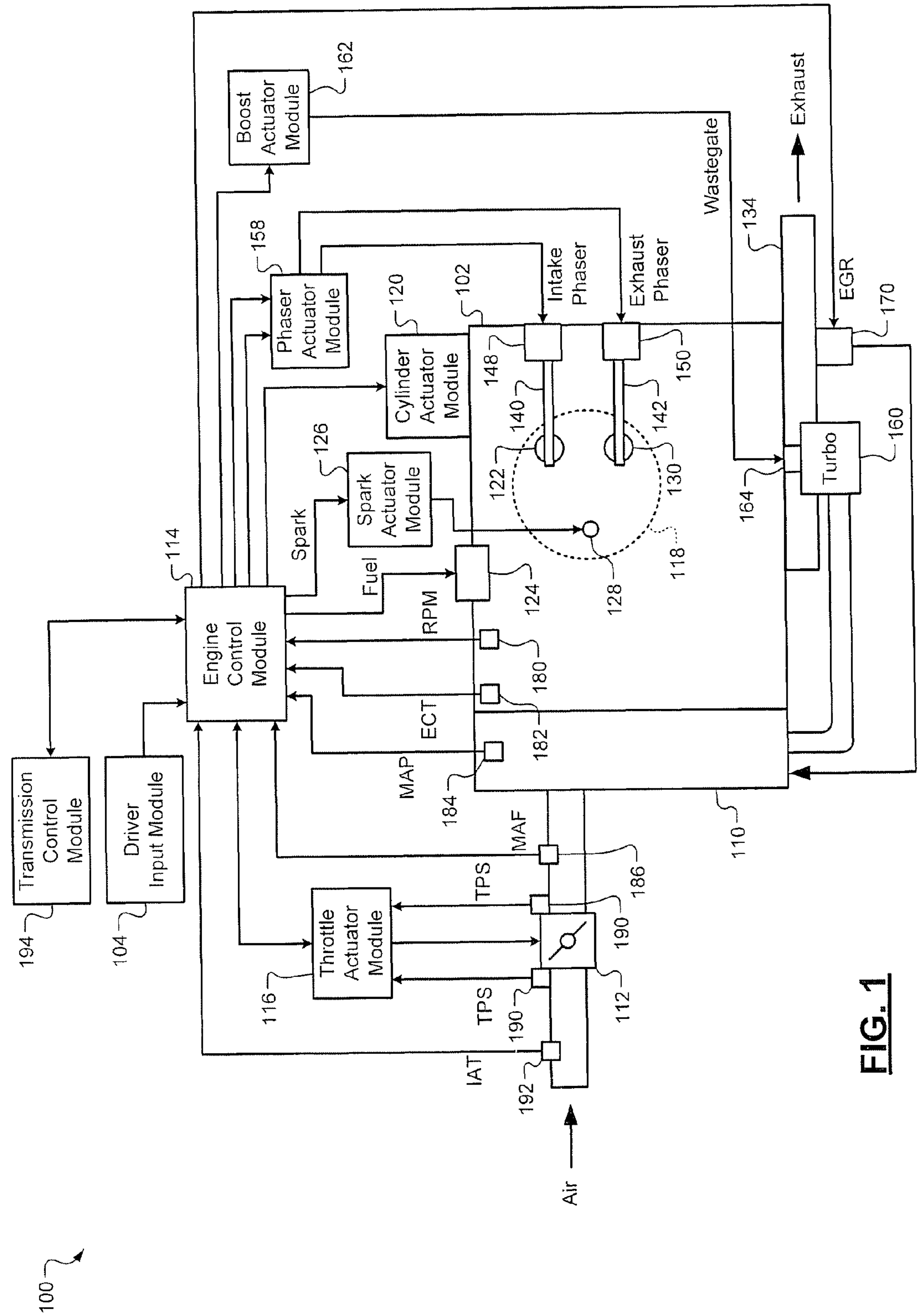
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary implementation of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control the exhaust valves of multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of a spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

When an engine transitions from producing one torque to producing another torque, many actuator positions will change to produce the new torque most efficiently. For example, the spark advance, throttle position, exhaust gas recirculation (EGR) regulation, and cam phaser positions may change. Changing one of these actuator positions often creates engine conditions that would benefit from changes to other actuator positions, which might then result in changes to the original actuators. This feedback results in iteratively updating actuator positions until they are all positioned to produce a desired predicted torque most efficiently.

Large changes in torque often cause significant changes in engine actuators, which cyclically cause significant change in other engine actuators. This is especially true when using a boost device, such as a turbocharger or supercharger. For example, when the engine is commanded to significantly increase a torque output, the engine may request that the turbocharger increase boost.

In various implementations, when boost pressure is increased, detonation, or engine knock, is more likely. Therefore, as the turbocharger approaches this increased boost level, the spark advance may need to be decreased. Once the spark advance is decreased, the desired turbocharger boost may need to be increased to achieve the desired predicted torque.

Figure 2:
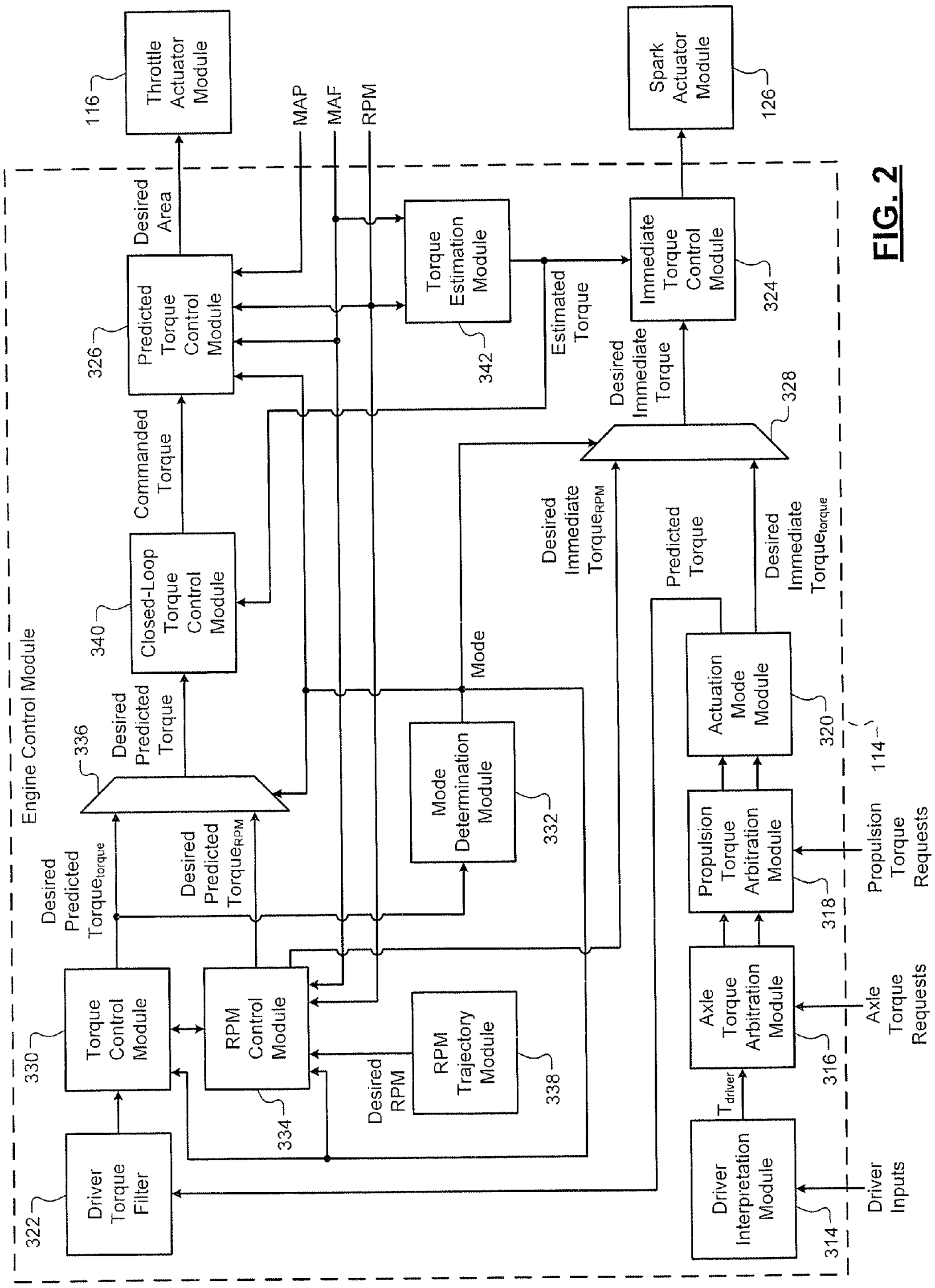
FIG. 2 is a functional block diagram of an exemplary implementation of an engine control module according to the principles of the present disclosure.

This circular dependency causes the engine to reach the desired predicted torque more slowly. This problem is exacerbated because of the already slow response of turbocharger boost, commonly referred to as turbo lag. FIG. 2 depicts an engine control system capable of accelerating the circular dependency of boost and spark advance.

Figure 3:
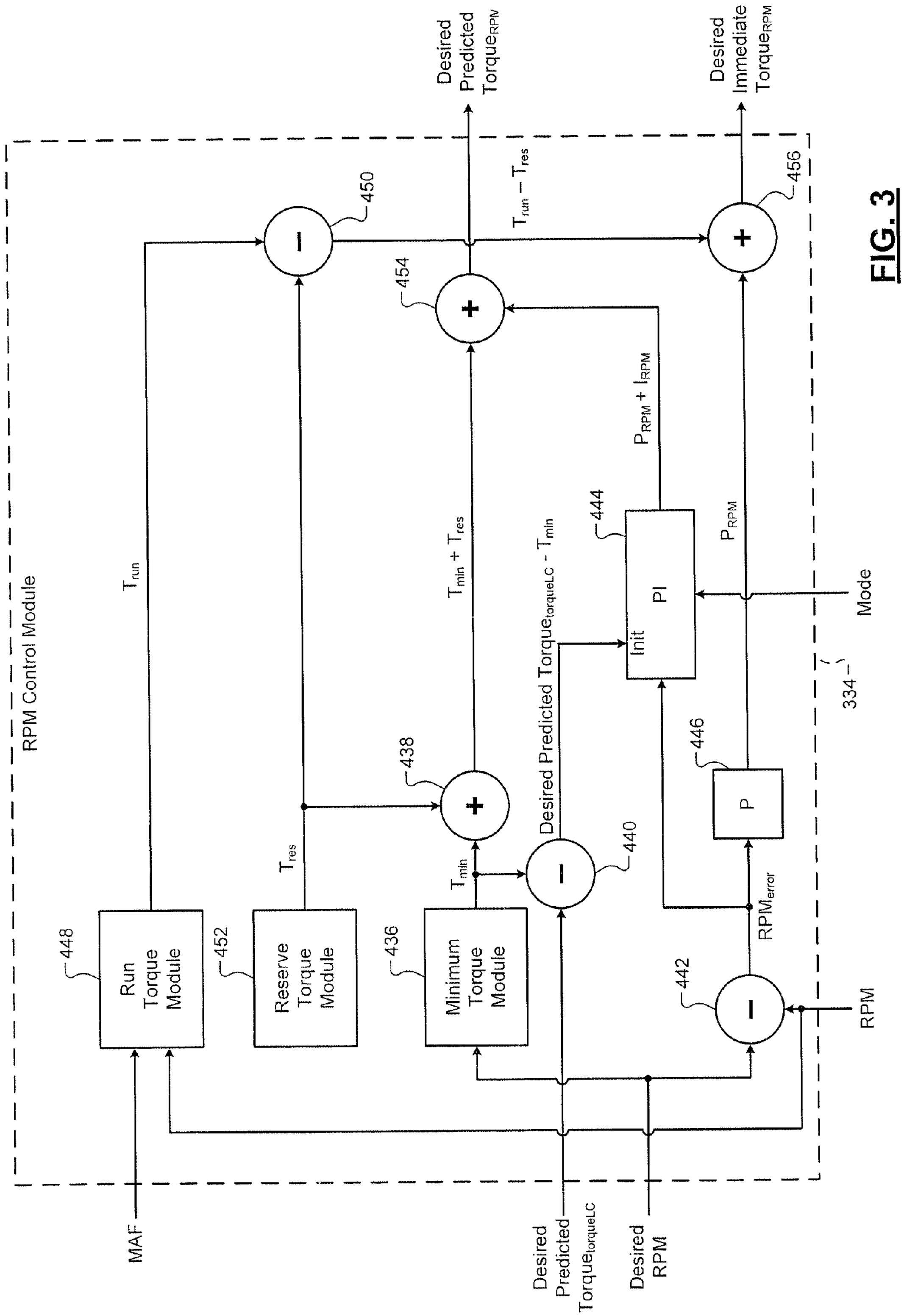
FIG. 3 is a functional block diagram of an exemplary implementation of an RPM control module according to the principles of the present disclosure.
Figure 4:
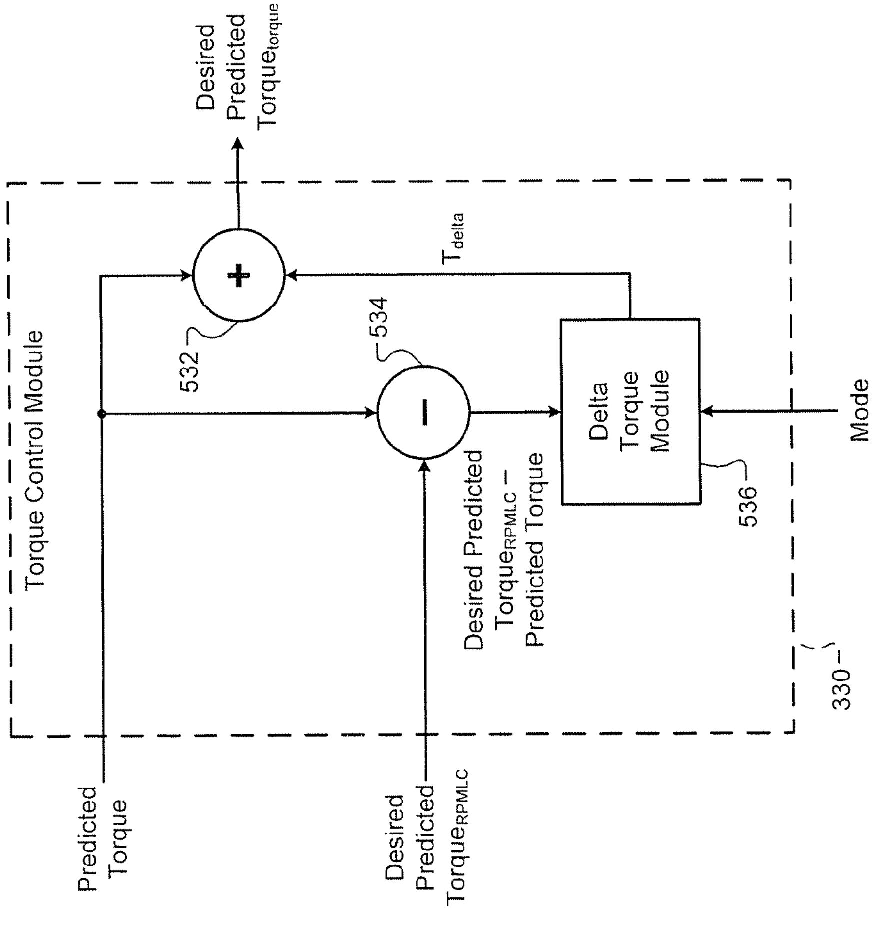
FIG. 4 is a functional block diagram of an exemplary implementation of a torque control module according to the principles of the present disclosure.

FIG. 3 depicts an RPM control module that determines an RPM correction factor at a new RPM level and determines the new torque level based on the RPM correction factor. The RPM control module may output the new torque level to a closed-loop torque control module. FIG. 4 depicts a torque control module that determines a torque correction factor at a new torque level and determines the new torque level based on the torque correction factor. The torque control module may output the new torque level to a closed-loop torque control module.

Figure 5:
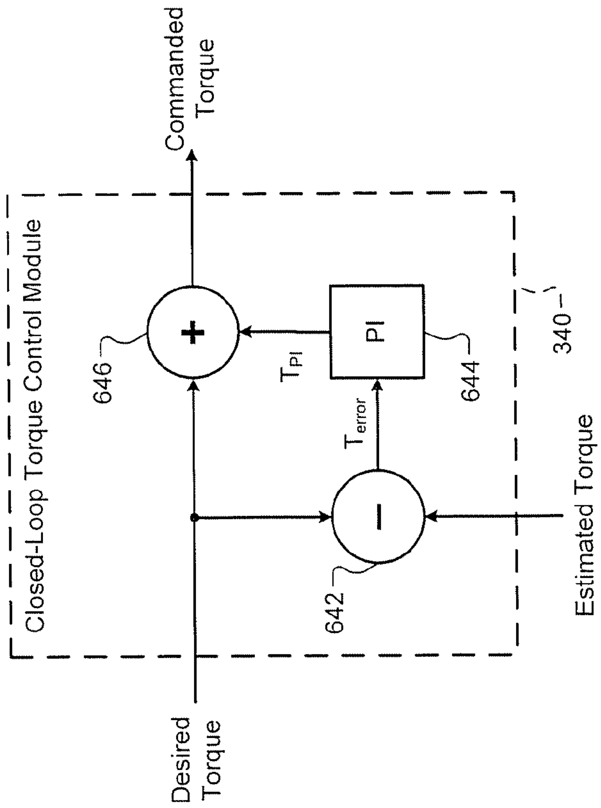
FIG. 5 is a functional block diagram of an exemplary implementation of a closed-loop torque control module according to the principles of the present disclosure.
Figure 6:
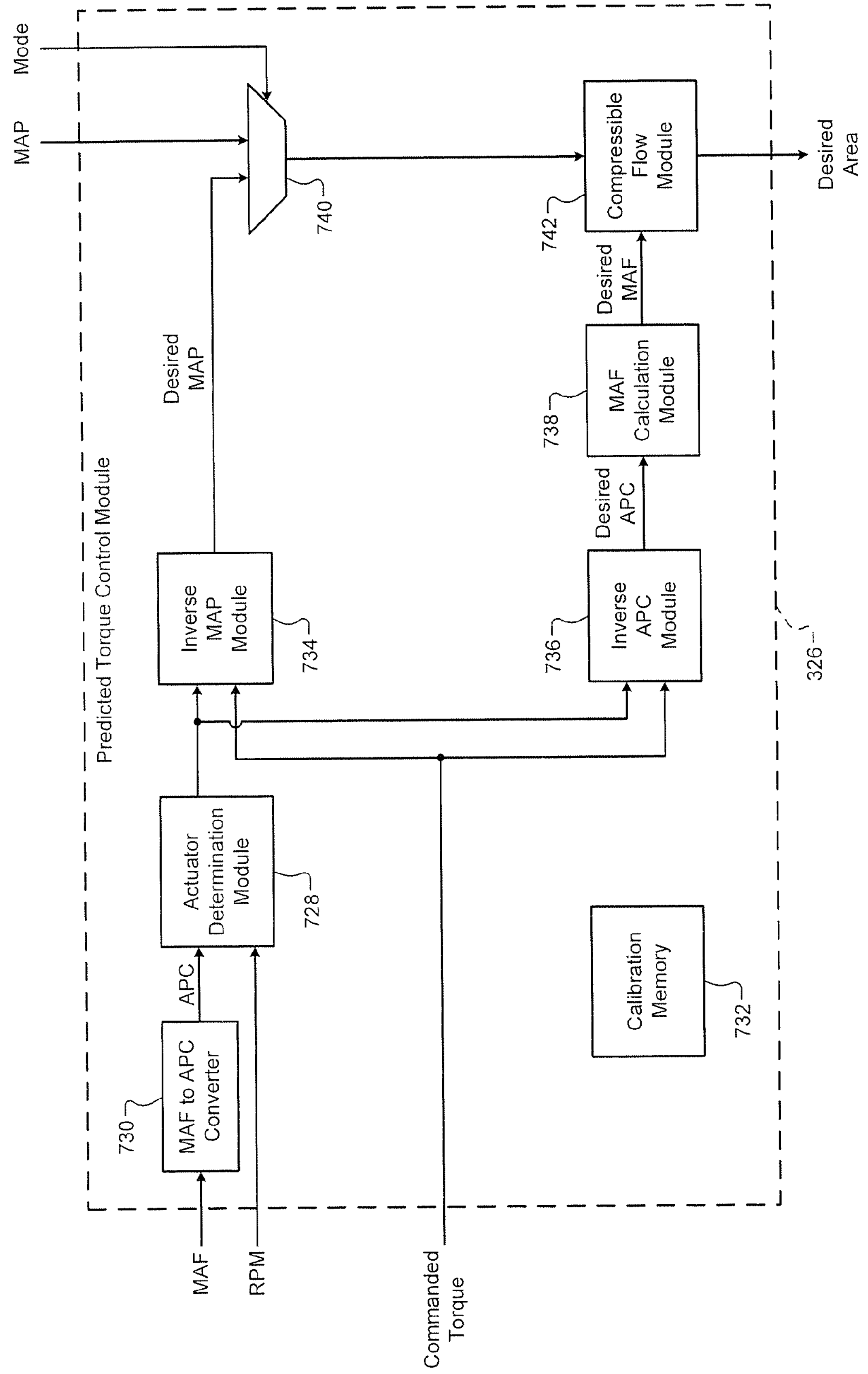
FIG. 6 is a function block diagram of an exemplary implementation of a predicted torque control module according to the principles of the present disclosure.

FIG. 5 depicts the closed-loop torque control module that determines a torque correction factor at the new torque level and determines a commanded torque based on the torque correction factor. The closed-loop torque control module outputs the commanded torque to a predicted torque control module. FIG. 6 depicts the predicted torque control module that estimates the airflow that will be present at the commanded torque and determines desired actuator positions based on the estimated airflow. The predicted torque control module then determines engine parameters based on the desired actuator positions and the desired predicted torque. For example, the engine parameters may include desired manifold absolute pressure (MAP), desired throttle area, and/or desired air per cylinder (APC).

Figure 7:
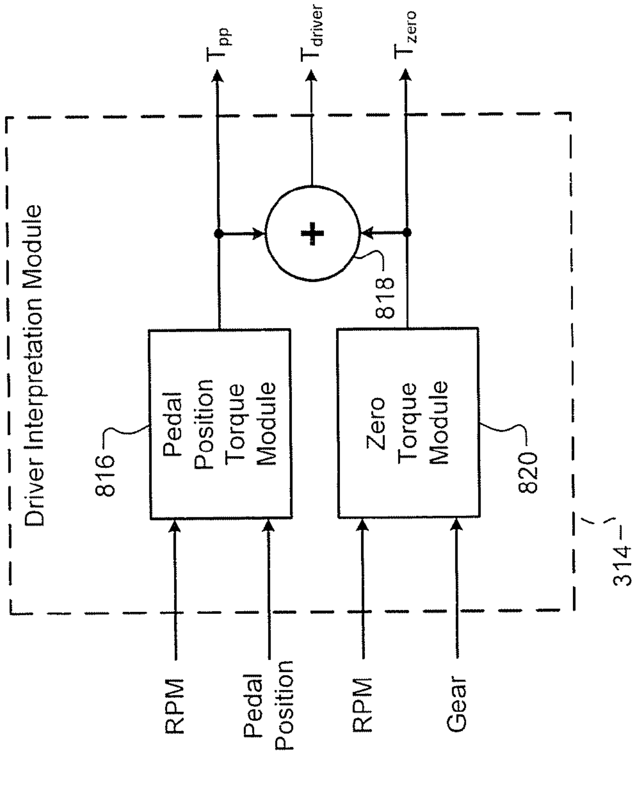
FIG. 7 is a functional block diagram of an exemplary implementation of a driver interpretation module according to the principles of the present disclosure.

In other words, the predicted torque control module can essentially perform the first iteration of actuator position updating in software. The actuator positions commanded should then be closer to the final actuator positions. FIG. 7 depicts exemplary steps performed by the engine control system to determine when and how to perform this modeled iteration.

Referring now to FIG. 2, a functional block diagram of an exemplary implementation of the ECM 114 is presented. The ECM 114 includes a driver interpretation module 314. The driver interpretation module 314 receives driver inputs from the driver input module 104. For example, the driver inputs may include an accelerator pedal position. The driver interpretation module outputs a driver torque, or the amount of torque requested by a driver via the driver inputs.

The ECM 114 includes an axle torque arbitration module 316. The axle torque arbitration module 316 arbitrates between driver inputs from the driver interpretation module 314 and other axle torque requests. Other axle torque requests may include torque reduction requested during a gear shift by the transmission control module 194, torque reduction requested during wheel slip by a traction control system, and torque requests to control speed from a cruise control system.

The axle torque arbitration module 316 outputs a predicted torque and a torque desired immediate torque. The predicted torque is the amount of torque that will be required in the future to meet the driver's torque and/or speed requests. The torque desired immediate torque is the torque required at the present moment to meet temporary torque requests, such as torque reductions when shifting gears or when traction control senses wheel slippage.

The torque desired immediate torque may be achieved by engine actuators that respond quickly, while slower engine actuators are targeted to achieve the predicted torque. For example, a spark actuator may be able to quickly change the spark advance, while cam phaser or throttle actuators may be slower to respond. The axle torque arbitration module 316 outputs the predicted torque and the torque desired immediate torque to a propulsion torque arbitration module 318.

The propulsion torque arbitration module 318 arbitrates between the predicted torque, the torque desired immediate torque and propulsion torque requests. Propulsion torque requests may include torque reductions for engine over-speed protection and torque increases for stall prevention.

An actuation mode module 320 receives the predicted torque and torque desired immediate torque from the propulsion torque arbitration module 318. Based upon a mode setting, the actuation mode module 320 determines how the predicted torque and the torque desired immediate torque will be achieved. For example, in a first mode of operation, the actuation mode module 320 may output the predicted torque to a driver torque filter 322.

In the first mode of operation, the actuation mode module 320 may instruct an immediate torque control module 324 to set the spark advance to a calibration value that achieves the maximum possible torque. The immediate torque control module 324 may control engine parameters that change relatively more quickly than engine parameters controlled by a predicted torque control module 326. For example, the immediate torque control module 324 may control spark advance, which may reach a commanded value by the time the next cylinder fires. In the first mode of operation, the torque desired immediate torque is ignored by the predicted torque control module 326 and by the immediate torque control module 324.

In a second mode of operation, the actuation mode module 320 may output the predicted torque to the driver torque filter 322. However, the actuation mode module 320 may instruct the immediate torque control module 324 to attempt to achieve the torque desired immediate torque, such as by retarding the spark.

In a third mode of operation, the actuation mode module 320 may instruct the cylinder actuator module 120 to deactivate cylinders if necessary to achieve the torque desired immediate torque. In this mode of operation, the predicted torque is output to the driver torque filter 322 and the torque desired immediate torque is output to a first selection module 328. For example only, the first selection module 328 may be a multiplexer or a switch.

In a fourth mode of operation, the actuation mode module 320 outputs a reduced torque to the driver torque filter 322. The predicted torque may be reduced only so far as is necessary to allow the immediate torque control module 324 to achieve the torque desired immediate torque using spark retard.

The driver torque filter 322 receives the predicted torque from the actuation mode module 320. The driver torque filter 322 may receive signals from the axle torque arbitration module 316 and/or the propulsion torque arbitration module 318 indicating whether the predicted torque is a result of driver input. If so, the driver torque filter 322 may filter out high frequency torque changes, such as those that may be caused by the driver's foot modulating the accelerator pedal while on rough road. The driver torque filter 322 outputs the predicted torque to a torque control module 330.

The ECM 114 includes a mode determination module 332. For example only, the mode determination module 332 may receive a torque desired predicted torque from the torque control module 330. The mode determination module 332 may determine a control mode based on the torque desired predicted torque. When the torque desired predicted torque is less than a calibrated torque, the control mode may be an RPM control mode. When the torque desired predicted torque is greater than or equal to the calibrated torque, the control mode may be a torque control mode. The control mode $MODE_1$ may be determined by the following equation:

$$MODE_1 = \begin{bmatrix} RPM, \text{ if } (T_{torque} < CAL_T) \\ \text{TORQUE, if } (T_{torque} \geq CAL_T) \end{bmatrix}, \quad (1)$$

where $T_{torque}$ is the torque desired predicted torque and $CAL_T$ is the calibrated torque.

The torque control module 330 receives the predicted torque from the driver torque filter 322, the control mode from the mode determination module 332, and an RPM desired predicted torque from an RPM control module 334. The torque control module 330 determines (i.e., initializes) a delta torque based on the predicted torque and the RPM desired predicted torque when the control mode is transitioning from the RPM control mode to the torque control mode. The delta torque $T_{delta}$ may be determined by the following equation:

$$T_{delta}=T_{RPMLC}-T_{zero}, \quad (2)$$

where $T_{RPMLC}$ is a last commanded RPM desired predicted torque, and $T_{zero}$ is a torque value at a zero accelerator pedal position (i.e., when the driver's foot is off the accelerator pedal) that is determined based on the predicted torque. The torque control module 330 may decay each term of the equation defining the delta torque to zero when the control mode is the torque control mode. For example only, the delta torque may be decayed linearly, exponentially, and/or in pieces.

The torque control module 330 adds the delta torque to the predicted torque to determine the torque desired predicted torque. The torque desired predicted torque $T_{torque}$ may be determined by the following equation:

$$T_{torque}=T_{pp}+T_{zero}+T_{delta}, \quad (3)$$

where $T_{pp}$ is a torque value at the accelerator pedal position that is determined based on the predicted torque.

Further discussion of the functionality of the torque control module 330 may be found in commonly assigned U.S. Pat. No. 7,021,282, issued on Apr. 4, 2006 and entitled "Coordinated Engine Torque Control," the disclosure of which is incorporated herein by reference in its entirety. The torque control module 330 outputs the torque desired predicted torque to a second selection module 336. For example only, the second selection module 336 may be a multiplexer or a switch.

The ECM 114 includes an RPM trajectory module 338. The RPM trajectory module 338 determines a desired RPM based on a standard block of RPM control described in detail in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety. The desired RPM may include a desired idle RPM, a stabilized RPM, a target RPM, or a current RPM.

The RPM control module 334 receives the desired RPM from the RPM trajectory module 338, the control mode from the mode determination module 332, an RPM signal from the RPM sensor 180, a MAF signal from the MAF sensor 186, and the torque desired predicted torque from the torque control module 330. The RPM control module 334 determines a minimum torque required to maintain the desired RPM, for example, from a look-up table. The RPM control module 334 determines a reserve torque. The reserve torque is an additional amount of torque that is incorporated to compensate for unknown loads that can suddenly load the engine system 100.

The RPM control module 334 determines a run torque based on the MAF signal. The run torque $T_{run}$ is determined based on the following relationship:

$$T_{run}=f(APC_{act},RPM,S,I,E), \quad (4)$$

where $APC_{act}$ is an actual air per cylinder value that is determined based on the MAF signal, S is the spark advance, I is intake cam phaser positions, and E is exhaust cam phaser positions.

The RPM control module 334 compares the desired RPM to the RPM signal to determine an RPM correction factor. The RPM control module 334 adds the RPM correction factor to the minimum and reserve torques to determine the RPM desired predicted torque. The RPM control module 334 subtracts the reserve torque from the run torque and adds this value to the RPM correction factor to determine an RPM desired immediate torque.

In various implementations, the RPM control module 334 may simply determine the RPM correction factor equal to the difference between the desired RPM and the RPM signal. Alternatively, the RPM control module 334 may use a proportional-integral (PI) control scheme to meet the desired RPM from the RPM trajectory module 338. The RPM correction factor may include an RPM proportional, or a proportional offset based on the difference between the desired RPM and the RPM signal. The RPM correction factor may also include an RPM integral, or an offset based on an integral of the difference between the desired RPM and the RPM signal. The RPM proportional $P_{rpm}$ may be determined by the following equation:

$$P_{RPM}=K_P*(RPM_{des}-RPM), \quad (5)$$

where $K_P$ is a pre-determined proportional constant. The RPM integral $I_{RPM}$ may be determined by the following equation:

$$I_{RPM}=K_I*\int(RPM_{des}-RPM)\partial t, \quad (6)$$

where $K_I$ is a pre-determined integral constant.

Further discussion of PI control can be found in commonly assigned patent application Ser. No. 11/656,929, filed Jan. 23, 2007, and entitled "Engine Torque Control at High Pressure Ratio," the disclosure of which is incorporated herein by reference in its entirety. Additional discussion regarding PI control of engine speed can be found in commonly assigned patent application Ser. No. 11/685,735, filed Mar. 13, 2007, and entitled "Torque Based Engine Speed Control," the disclosure of which is incorporated herein by reference in its entirety.

The RPM control module 334 determines (i.e., initializes) the RPM integral based on the minimum torque and the torque desired predicted torque when the control mode is transitioning from the torque control mode to the RPM control mode. The RPM integral $I_{RPM}$ may be determined by the following equation:

$$I_{RPM}=T_{torqueLC}-T_{min}, \quad (7)$$

where $T_{torqueLC}$ is a last commanded torque desired predicted torque and $T_{min}$ is the minimum torque.

The RPM desired predicted torque $T_{RPM}$ may be determined by the following equation:

$$T_{RPM}=T_{min}+T_{res}+P_{RPM}+I_{RPM}, \quad (8)$$

where $T_{res}$ is the reserve torque. Further discussion of the functionality of the RPM control module 334 may be found in commonly assigned patent application Ser. No. 11/685,735, filed Mar. 13, 2007, and entitled "Torque Based Speed Control," the disclosure of which is incorporated herein by reference in its entirety. The RPM control module 334 outputs the RPM desired predicted torque to the second selection module 336 and the RPM desired immediate torque to the first selection module 328.

The second selection module 336 receives the torque desired predicted torque from the torque control module 330 and the RPM desired predicted torque from the RPM control module 334. The mode determination module 332 controls the second selection module 336 to choose whether the torque desired predicted torque or the RPM desired predicted torque should be used to determine a desired predicted torque. The mode determination module 332 therefore instructs the second selection module 336 to output the desired predicted torque from either the torque control module 330 or the RPM control module 334.

The mode determination module 332 may select the desired predicted torque based upon the control mode. The mode determination module 332 may select the desired predicted torque to be based upon the torque desired predicted torque when the control mode is the torque control mode. The mode determination module 332 may select the desired predicted torque to be based upon the RPM desired predicted torque when the control mode is the RPM control mode. The second selection module 336 outputs the desired predicted torque to a closed-loop torque control module 340.

The closed-loop torque control module 340 receives the desired predicted torque from the second selection module 336 and an estimated torque from a torque estimation module 342. The estimated torque may be defined as the amount of torque that could immediately be produced by setting the spark advance to a calibrated value. This value may be calibrated to be the minimum spark advance that achieves the greatest torque for a given RPM and air per cylinder. The torque estimation module 342 may use the MAF signal from the MAF sensor 186 and the RPM signal from the RPM sensor 180 to determine the estimated torque. Further discussion of torque estimation can be found in commonly assigned U.S. Pat. No. 6,704,638, issued on Mar. 9, 2004 and entitled "Torque Estimator for Engine RPM and Torque Control," the disclosure of which is incorporated herein by reference in its entirety.

The closed-loop torque control module 340 compares the desired predicted torque to the estimated torque to determine a torque correction factor. The closed-loop torque control module 340 adds the torque correction factor to the desired predicted torque to determine a commanded torque.

In various implementations, the closed-loop torque control module 340 may simply determine the torque correction factor equal to the difference between the desired predicted torque and the estimated torque. Alternatively, the closed-loop torque control module 340 may use a PI control scheme to meet the desired predicted torque from the second selection module 336. The torque correction factor may include a torque proportional, or a proportional offset based on the difference between the desired predicted torque and the estimated torque. The torque correction factor may also include a torque integral, or an offset based on an integral of the difference between the desired predicted torque and the estimated torque. The torque correction factor $T_{PI}$ may be determined by the following equation:

$$T_{PI}=K_P*(T_{des}-T_{est})+K_I*\int(T_{des}-T_{est})\partial t, \quad (9)$$

where $K_P$ is a pre-determined proportional constant and $K_I$ is a pre-determined integral constant.

The closed-loop torque control module 340 outputs the commanded torque to the predicted torque control module 326. The predicted torque control module 326 receives the commanded torque, the control mode from the mode determination module 332, the MAF signal from the MAF sensor 186, the RPM signal from the RPM sensor 180, and the MAP signal from the MAP sensor 184. The predicted torque control module 326 converts the commanded torque to desired engine parameters, such as desired manifold absolute pressure (MAP), desired throttle area, and/or desired air per cylinder (APC). For example only, the predicted torque control module 326 may determine the desired throttle area, which is output to the throttle actuator module 116. The throttle actuator module 116 then regulates the throttle valve 112 to produce the desired throttle area.

The first selection module 328 receives the torque desired immediate torque from the actuation mode module 320 and the RPM desired immediate torque from the RPM control module 334. The mode determination module 332 controls the first selection module 328 to choose whether the torque desired immediate torque or the RPM desired immediate torque should be used to determine a desired immediate torque. The mode determination module 332 therefore instructs the first selection module 328 to output the desired immediate torque from either the propulsion torque arbitration module 318 or the RPM control module 334.

The mode determination module 332 may select the desired immediate torque based upon the control mode. The mode determination module 332 may select the desired immediate torque to be based upon the torque desired immediate torque when the control mode is the torque control mode. The mode determination module 332 may select the desired immediate torque to be based upon the RPM desired immediate torque when the control mode is the RPM control mode. The first selection module 328 outputs the desired immediate torque to the immediate torque control module 324.

The immediate torque control module 324 receives the desired immediate torque from the first selection module 328 and the estimated torque from the torque estimation module 342. The immediate torque control module 324 may set the spark advance using the spark actuator module 126 to achieve the desired immediate torque. The immediate torque control module 324 can then select a smaller spark advance that reduces the estimated torque to the desired immediate torque.

Referring now to FIG. 3, a functional block diagram of an exemplary implementation of the RPM control module 334 is presented. The RPM control module 334 includes a minimum torque module 436 that receives the desired RPM from the RPM trajectory module 338. The minimum torque module 436 determines the minimum torque based on the desired RPM. The minimum torque module 436 outputs the minimum torque to a first summation module 438 and a first subtraction module 440.

The RPM control module 334 includes a second subtraction module 442 that receives the desired RPM from the RPM trajectory module 338 and the RPM signal from the RPM sensor 180. The second subtraction module 442 subtracts the RPM signal from the desired RPM to determine an RPM error. The second subtraction module 442 outputs the RPM error to a PI module 444 and a P module 446.

The first subtraction module 440 receives the minimum torque from the minimum torque module 436 and the last commanded torque desired predicted torque from the torque control module 330. The first subtraction module 440 subtracts the minimum torque from the last commanded torque desired predicted torque and outputs the difference to the PI module 444.

The RPM control module 334 includes a run torque module 448 that receives the MAF signal from the MAF sensor 186. The run torque module 448 determines the run torque based on the MAF signal. The run torque module 448 outputs the run torque to a third subtraction module 450.

The RPM control module 334 includes a reserve torque module 452 that determines the reserve torque. The reserve torque module 452 outputs the reserve torque to the third subtraction module 450 and the first summation module 438. The first summation module 438 receives the minimum torque from the minimum torque module 436 and the reserve torque from the reserve torque module 452. The first summation module 438 adds the minimum torque to the reserve torque and outputs the sum to a second summation module 454.

The PI module 444 receives the control mode from the mode determination module 332. The mode determination module 332 determines a first RPM correction factor that includes an RPM proportional and an RPM integral. The mode determination module 332 controls the PI module 444 to choose whether the difference between the last commanded torque desired predicted and minimum torques or the RPM error should be used to determine the RPM integral of the first RPM correction factor.

The mode determination module 332 may determine the RPM integral of the first RPM correction factor based upon the control mode. The mode determination module 332 may determine the RPM integral to be based upon the difference between the last commanded torque desired predicted and minimum torques when the control mode is transitioning from the torque control mode to the RPM control mode. The mode determination module 332 may select the RPM integral to be based upon the RPM error when the control mode is the RPM control mode. The PI module 444 outputs the first RPM correction factor to the second summation module 454.

The P module 446 receives the RPM error from the second subtraction module 442 and determines a second RPM correction factor. The second RPM correction factor includes an RPM proportional. The P module 446 outputs the second RPM correction factor to a third summation module 456.

The second summation module 454 receives the first RPM correction factor from the PI module 444 and the sum of the minimum and reserve torques from the first summation module 438. The second summation module 454 adds the first RPM correction factor to the sum of the minimum and reserve torques to determine the RPM desired predicted torque. The second summation module 454 outputs the RPM desired predicted torque to the second selection module 336 and the torque control module 330.

The third subtraction module 450 receives the run torque from the run torque module 448 and the reserve torque from the reserve torque module 452. The third subtraction module 450 subtracts the reserve torque from the run torque and outputs the difference to the third summation module 456. The third summation module 456 receives the difference of the run and reserve torques from the third subtraction module 450 and the second RPM correction factor from the P module 446. The third summation module 456 adds the second RPM correction factor to the difference of the run and reserve torques to determine the RPM desired immediate torque. The third summation module 456 outputs the RPM desired immediate torque to the first selection module 328.

Referring now to FIG. 4, a functional block diagram of an exemplary implementation of the torque control module 330 is presented. The torque control module 330 includes a summation module 532 that receives the predicted torque from the driver torque filter 322. The torque control module 330 further includes a subtraction module 534.

The subtraction module 534 receives the predicted torque from the driver torque filter 322 and the last commanded RPM desired predicted torque from the RPM control module 334. The subtraction module 534 subtracts the predicted torque from the last commanded RPM desired predicted torque and outputs the difference to a delta torque module 536. The delta torque module 536 receives the control mode from the mode determination module 332. The delta torque module 536 sets the delta torque to the difference when the control mode is transitioning from the RPM control mode to the torque control mode. The delta torque module 536 decays the delta torque when the control mode is the torque control mode.

The delta torque module 536 outputs the delta torque to the summation module 532. The summation module 532 adds the predicted torque to the delta torque to determine the torque desired predicted torque. The summation module 532 outputs the torque desired predicted torque to the second selection module 336 and the RPM control module 334.

Referring now to FIG. 5, a functional block diagram of an exemplary implementation of the closed-loop torque control module 340 is presented. The closed-loop torque control module 340 includes a subtraction module 642 that receives the desired predicted torque from the second selection module 336 and the estimated torque from the torque estimation module 342. The subtraction module 642 subtracts the estimated torque from the desired predicted torque to determine a torque error.

A PI module 644 receives the torque error from the subtraction module 642 and determines the torque correction factor. The torque correction factor includes a torque proportional and a torque integral. The PI module outputs the torque correction factor to a summation module 646.

The summation module 646 receives the torque correction factor from the PI module 644 and the desired predicted torque from the second selection module 336. The summation module 646 adds the torque correction factor to the desired predicted torque to determine the commanded torque. The summation module 646 outputs the commanded torque to the predicted torque control module 326.

Referring now to FIG. 6, a functional block diagram of an exemplary implementation of the predicted torque control module 326 is presented. The predicted torque control module 326 includes an actuator determination module 728 that receives the RPM signal and an air per cylinder (APC) signal. The APC signal may be received from a MAF to APC converter 730 that converts the MAF signal into the APC signal.

The actuator determination module 728 determines desired actuator positions, such as intake and exhaust cam phaser positions, the spark advance, and air/fuel ratio. The intake and exhaust cam phaser positions and the spark advance may be functions of RPM and APC, while the air/fuel ratio may be a function of APC.

These functions may be implemented in a calibration memory 732. The APC value may be filtered before being used to determine one or more of the desired actuator positions. For example, the air/fuel ratio may be determined based upon a filtered APC. The actuator determination module 728 outputs the desired actuator positions to an inverse MAP module 734 and to an inverse APC module 736.

The inverse APC module 736 receives the desired actuator positions from the actuator determination module 728 and the commanded torque from the closed-loop torque control module 340. The inverse APC module 736 may determine a desired APC based upon the commanded torque and the desired actuator positions. The inverse APC module 736 may implement a torque model that estimates torque based on the desired actuator positions such as the desired APC, the spark advance (S), the intake (I) and exhaust (E) cam phaser positions, an air/fuel ratio (AF), an oil temperature (OT), and a number of cylinders currently being fueled (#). If the commanded torque $T_c$ is assumed to be the torque model output, and the desired actuator positions are substituted, the inverse APC module 736 can solve the torque model for the only unknown, the desired APC. This inverse use of the torque model may be represented as follows:

$$APC_{des}=T_{apc}^{-1}(T_c,S,I,E,AF,OT,\#,RPM). \quad (10)$$

The inverse APC module 736 outputs the desired APC to a MAF calculation module 738.

The inverse MAP module 734 receives the desired actuator positions from the actuator determination module 728 and the commanded torque from the closed-loop torque control module 340. The inverse MAP module 734 determines a desired MAP based on the commanded torque and the desired actuator positions. The desired MAP may be determined by the following equation:

$$MAP_{des}=T_{map}^{-1}((T_c+f(delta\_T)),S,I,E,AF,OT,\#,RPM), \quad (11)$$

where f(delta_T) is a filtered difference between MAP-based and APC-based torque estimators. The inverse MAP module 734 outputs the desired MAP to a selection module 740. For example only, the selection module 740 may be a multiplexer or a switch.

The MAF calculation module 738 determines a desired MAF based on the desired APC. The desired MAF may be calculated using the following equation:

$$MAF_{des}=\frac{APC_{des}\cdot RPM\cdot \#}{60_{s/min}\cdot 2_{rev/firing}}. \quad (12)$$

The MAF calculation module 738 outputs the desired MAF to a compressible flow module 742.

The selection module 740 receives the MAP signal from the MAP sensor 184. The mode determination module 332 controls the selection module 740 to choose whether the MAP signal or the desired MAP should be used to determine a MAP value. The mode determination module 332 therefore instructs the selection module 740 to output the MAP value from either the MAP sensor 184 or the inverse MAP module 734.

The mode determination module 332 may select the MAP value based upon the control mode. The mode determination module 332 may select the MAP value to be based upon the MAP signal when the control mode is the RPM control mode. The mode determination module 332 may select the MAP value to be based upon the desired MAP when the control mode is the torque control mode. The selection module 740 outputs the MAP value to the compressible flow module 742.

The compressible flow module 742 determines the desired throttle area based on the MAP value and the desired MAF. The desired throttle area may be calculated using the following equation:

$$Area_{des}=\frac{MAF_{des}\cdot\sqrt{R_{gas}\cdot T}}{P_{baro}\cdot\Phi(P_r)},\text{ where } P_r=\frac{MAP}{P_{baro}}, \quad (13)$$

and where $R_{gas}$ is the ideal gas constant, T is an intake air temperature, and $P_{baro}$ is a barometric pressure. $P_{baro}$ may be directly measured using a sensor, such as the IAT sensor 192, or may be calculated using other measured or estimated parameters.

The Φ function may account for changes in airflow due to pressure differences on either side of the throttle valve 112. The Φ function may be specified as follows:

$$\Phi(P_r)=\begin{cases}\sqrt{\frac{2\gamma}{\gamma-1}\left(1-P_r^{\frac{\gamma-1}{\gamma}}\right)} & \text{if } P_r>P_{critical}\\ \sqrt{\gamma\left(\frac{2}{\gamma+1}\right)^{\frac{\gamma+1}{\gamma-1}}} & \text{if } P_r\le P_{critical}\end{cases},\text{ where} \quad (14)$$

$$P_{critical}=\left(\frac{2}{\gamma+1}\right)^{\frac{\gamma}{\gamma-1}}=0.528\text{ for air}, \quad (15)$$

and where γ is a specific heat constant that is between approximately 1.3 and 1.4 for air. $P_{critical}$ is defined as the pressure ratio at which the velocity of the air flowing past the throttle valve 112 equals the velocity of sound, which is referred to as choked or critical flow. The compressible flow module 742 outputs the desired throttle area to the throttle actuator module 116, which controls the throttle valve 112 to provide the desired throttle area.

Referring now to FIG. 7, a functional block diagram of an exemplary implementation of the driver interpretation module 314 is presented. The driver interpretation module 314 includes a pedal position torque module 816 that receives the RPM signal from the RPM sensor 180 and the accelerator pedal position from the driver input module 104. The pedal position torque module 816 determines the torque value at the accelerator pedal position based on the RPM signal and the accelerator pedal position. The pedal position torque module 816 may output the torque value to the torque control module 330 and a summation module 818.

The driver interpretation module 314 includes a zero torque module 820 that receives the RPM signal from the RPM sensor 180 and a gear from the driver input module 104. The zero torque module 820 determines the torque value at the zero accelerator pedal position based on the RPM signal and the gear. The zero torque module 820 may output the torque value to the torque control module 330 and the summation module 818. The summation module 818 adds the torque value at the accelerator pedal position to the torque value at the zero accelerator pedal position to determine the driver torque. The driver interpretation module 314 outputs the driver torque to the axle torque arbitration module 316.

Figure 8:
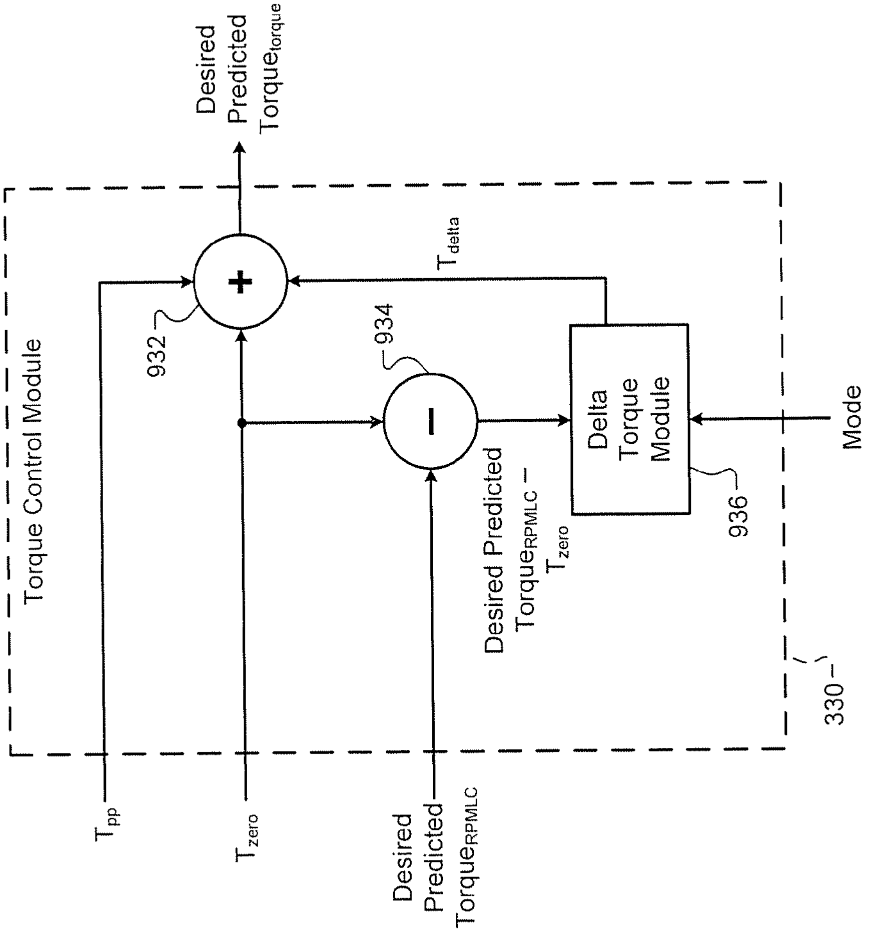
FIG. 8 is a functional block diagram of an alternative exemplary implementation of the torque control module according to the principles of the present disclosure.

Referring now to FIG. 8, a functional block diagram of an alternative exemplary implementation of the torque control module 330 is presented. The torque control module 330 includes a summation module 932 that receives the torque value at the accelerator pedal position from the driver interpretation module 314. The torque control module 330 further includes a subtraction module 934.

The subtraction module 934 receives the torque value at the zero accelerator pedal position from the driver interpretation module 314 and the last commanded RPM desired predicted torque from the RPM control module 334. The subtraction module 934 subtracts the torque value from the last commanded RPM desired predicted torque and outputs the difference to a delta torque module 936. The delta torque module 936 receives the control mode from the mode determination module 332. The delta torque module 936 sets the delta torque to the difference when the control mode is transitioning from the RPM control mode to the torque control mode. The delta torque module 936 decays the delta torque when the control mode is the torque control mode.

The delta torque module 936 outputs the delta torque to the summation module 932. The summation module 932 adds the torque value at the accelerator pedal position to the delta torque to determine the torque desired predicted torque. The summation module 532 outputs the torque desired predicted torque to the second selection module 336 and the RPM control module 334.

Figure 9:
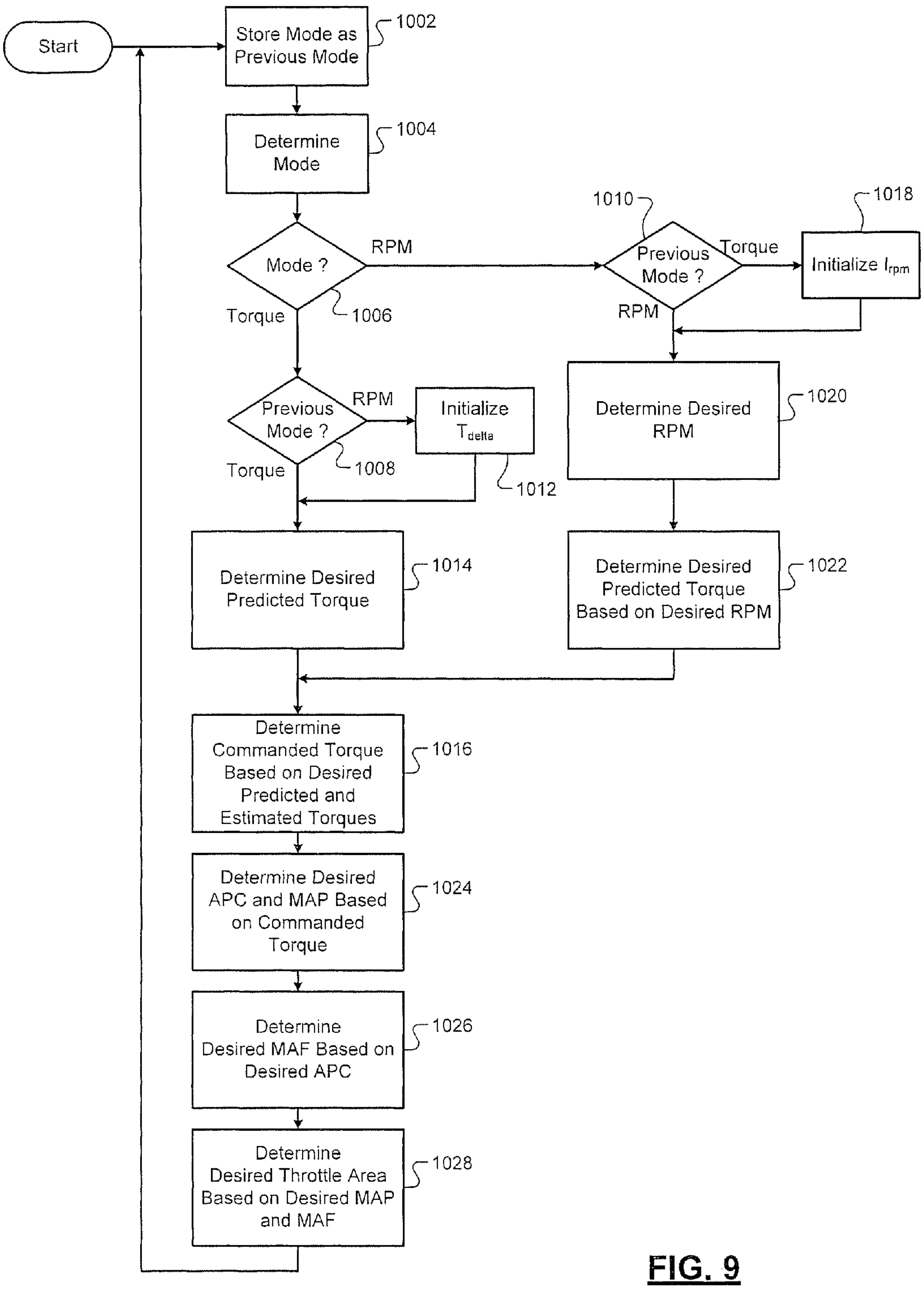
FIG. 9 is a flowchart depicting exemplary steps performed by the engine control module according to the principles of the present disclosure.

Referring now to FIG. 9, a flowchart depicting exemplary steps performed by the ECM 114 is presented. Control begins in step 1002, where the control mode is stored as a previous control mode. Control continues in step 1004, where the control mode is determined.

Control continues in step 1006, where control determines whether the control mode is the torque control mode or the RPM control mode. If the control mode is the torque control mode, control continues in step 1008; otherwise, control continues in step 1010.

In step 1008, control determines whether the previous control mode is the torque control mode or the RPM control mode. If the previous control mode is the RPM control mode, control continues in step 1012; otherwise, control continues in step 1014. In step 1012, the delta torque is initialized. Control continues in step 1014. In step 1014, the desired predicted torque is determined. Control continues in step 1016.

In step 1010, control determines whether the previous control mode is the torque control mode or the RPM control mode. If the previous control mode is the torque control mode, control continues in step 1018; otherwise, control continues in step 1020. In step 1018, the RPM integral is initialized. Control continues in step 1020. In step 1020, the desired RPM is determined. Control continues step 1022, where the desired predicted torque is determined based on the desired RPM. Control continues in step 1016.

In step 1016, the commanded torque is determined based on the desired predicted torque and the estimated torque. Control continues in step 1024, where the desired APC and MAP are determined based on the commanded torque. Control continues in step 1026, where the desired MAF is determined based on the desired APC. Control continues in step 1028, where the desired throttle area is determined based on the desired MAP and MAF. Control returns to step 1002.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An engine control module comprising:

a torque control module that determines a first desired torque based on a requested torque;

an engine speed (RPM) control module that selectively determines a second desired torque based on a desired RPM, wherein the torque control module determines the first desired torque further based on the second desired torque when the engine control module is transitioning from an RPM control mode to a torque control mode, wherein the RPM control module determines the second desired torque further based on the first desired torque when the engine control module is transitioning from the torque control mode to the RPM control mode; and an actuator module that controls an actuator of an engine based on the first desired torque when the engine control module is in the torque control mode and based on the second desired torque when the engine control module is in the RPM control mode.

2. The engine control module of claim 1 further comprising a mode determination module that selects the RPM control mode when the first desired torque is less than a predetermined value and that selects the torque control mode when the first desired torque is greater than or equal to the predetermined value.

3. The engine control module of claim 1 wherein the torque control module determines the first desired torque further based on a delta torque.

4. The engine control module of claim 3 wherein the torque control module determines the delta torque based on the second desired torque and a predicted torque when the engine control module is transitioning from the RPM control mode to the torque control mode.

5. The engine control module of claim 3 wherein the torque control module decays the delta torque to zero when the engine control module is in the torque control mode.

6. The engine control module of claim 3 wherein the requested torque comprises a pedal position torque and a zero torque.

7. The engine control module of claim 6 wherein the torque control module determines the delta torque based on the second desired torque and the zero torque when the engine control module is transitioning from the RPM control mode to the torque control mode.

8. The engine control module of claim 1 wherein the RPM control module determines the second desired torque further based on a measured RPM, a reserve torque, and an RPM integral.

9. The engine control module of claim 8 wherein the desired RPM comprises a minimum torque.

10. The engine control module of claim 9 wherein the RPM control module determines the RPM integral based on the first desired torque and the minimum torque when the engine control module is transitioning from the torque control mode to the RPM control mode.

11. The engine control module of claim 8 wherein the RPM control module determines the RPM integral based on the desired RPM and the measured RPM when the engine control module is in the RPM control mode.

12. The engine control module of claim 1 wherein the actuator module comprises at least one of a throttle actuator module, a boost actuator module, and a phaser actuator module.

13. A method of operating an engine control module comprising:

determining a first desired torque based on a requested torque;

selectively determining a second desired torque based on a desired RPM;

determining the first desired torque further based on the second desired torque when the engine control module is transitioning from an RPM control mode to a torque control mode;

determining the second desired torque further based on the first desired torque when the engine control module is transitioning from the torque control mode to the RPM control mode; and controlling an actuator of an engine based on the first desired torque when the engine control module is in the torque control mode and based on the second desired torque when the engine control module is in the RPM control mode.

14. The method of claim 13 further comprising:

selecting the RPM control mode when the first desired torque is less than a predetermined value; and selecting the torque control mode when the first desired torque is greater than or equal to the predetermined value.

15. The method of claim 13 further comprising determining the first desired torque further based on a delta torque.

16. The method of claim 15 further comprising determining the delta torque based on the second desired torque and a predicted torque when the engine control module is transitioning from the RPM control mode to the torque control mode.

17. The method of claim 15 further comprising decaying the delta torque to zero when the engine control module is in the torque control mode.

18. The method of claim 15 wherein the requested torque comprises a pedal position torque and a zero torque.

19. The method of claim 18 further comprising determining the delta torque based on the second desired torque and the zero torque when the engine control module is transitioning from the RPM control mode to the torque control mode.

20. The method of claim 13 further comprising determining the second desired torque further based on a measured RPM, a reserve torque, and an RPM integral.

21. The method of claim 20 wherein the desired RPM comprises a minimum torque.

22. The method of claim 21 further comprising determining the RPM integral based on the first desired torque and the minimum torque when the engine control module is transitioning from the torque control mode to the RPM control mode.

23. The method of claim 20 further comprising determining the RPM integral based on the desired RPM and the measured RPM when the engine control module is in the RPM control mode.

* * * * *